United States Patent [19]

Miyamoto et al.

[11] Patent Number: 4,725,895
[45] Date of Patent: Feb. 16, 1988

[54] STILL PICTURE REPRODUCTION SYSTEM WITH COLOR FRAMING PHASE SYNCHRONIZATION

[75] Inventors: Masahiro Miyamoto; Kazuhisa Nishimura; Mitsugu Yoshihiro, all of Kanagawa, Japan

[73] Assignee: Sony Corporation, Tokyo, Japan

[21] Appl. No.: 875,186

[22] Filed: Jun. 17, 1986

[30] Foreign Application Priority Data

Jun. 19, 1985 [JP] Japan ................................. 60-133278

[51] Int. Cl.$^4$ ............................................. H04N 9/87
[52] U.S. Cl. ..................................... 358/312; 358/324
[58] Field of Search ............... 358/311, 312, 324, 326; 360/10.2, 10.3, 14.1

[56] References Cited

U.S. PATENT DOCUMENTS

| | | | |
|---|---|---|---|
| 3,594,498 | 7/1971 | Smith | 358/324 |
| 4,258,384 | 3/1981 | Tatami | 358/324 |
| 4,494,153 | 1/1985 | Ravizza | 358/324 |
| 4,531,162 | 7/1985 | Tokumitsu | 360/10.3 |
| 4,613,914 | 9/1986 | Kobori et al. | 360/10.2 |
| 4,659,539 | 3/1987 | Tanaka | 358/312 |

Primary Examiner—Donald McElheny, Jr.
Attorney, Agent, or Firm—Lewis H. Eslinger; Alvin Sinderbrand

[57] ABSTRACT

In a helical-scan video tape recorder, when the color framing of a reproduced video signal when a magnetic tape is stopped and of a reference video signal when an activation command signal is sent to control means for controlling a capstan motor do not coincide, the activation state of a magnetic tape of the video tape recorder (VTR) is so controlled that the color framings of both video signals are quickly matched with each other.

4 Claims, 18 Drawing Figures

PRIOR ART  REF

FIELD #1  FIELD #2  FIELD #3  FIELD #4

PRIOR ART  $S_R$

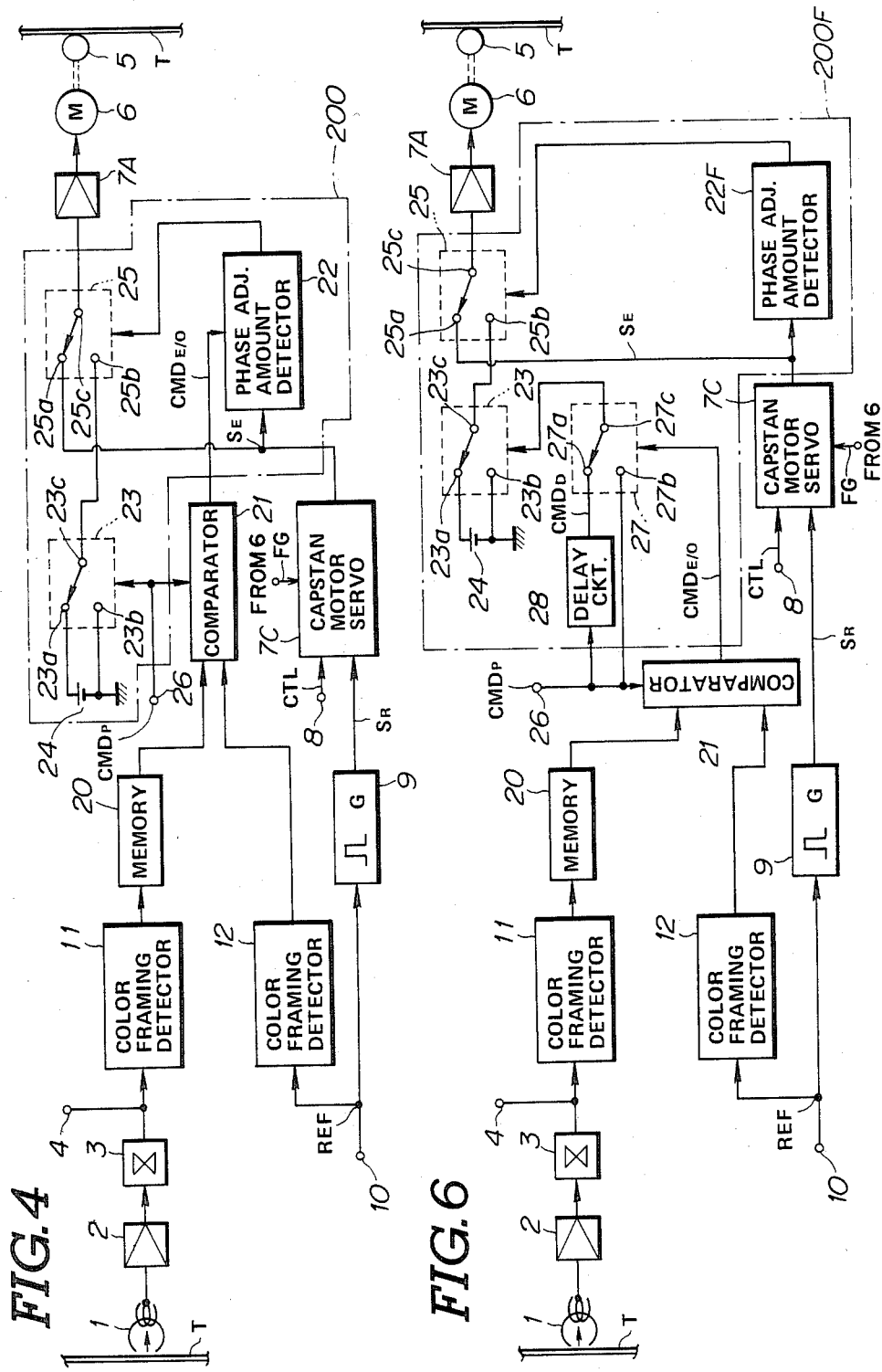

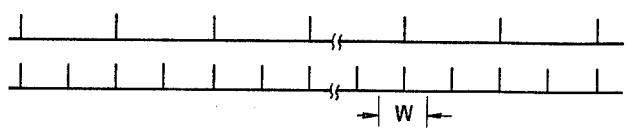
FIG. 5A
FIG. 5B
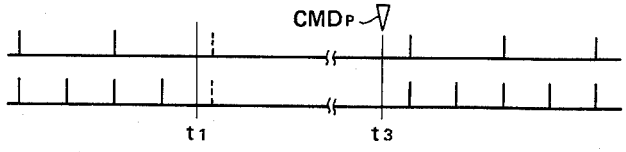
FIG. 5C
FIG. 5D
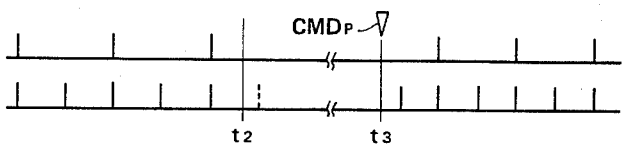
FIG. 5E
FIG. 5F
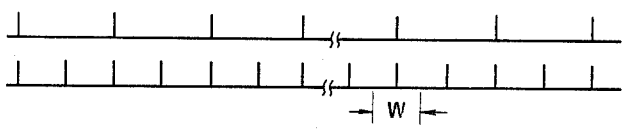
FIG. 7A
FIG. 7B
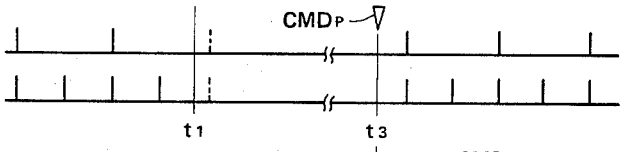
FIG. 7C
FIG. 7D
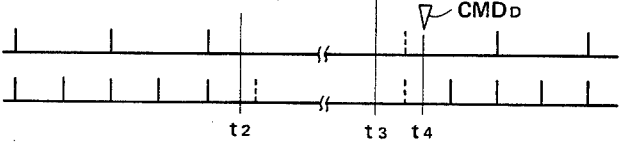
FIG. 7E
FIG. 7F

STILL PICTURE REPRODUCTION SYSTEM WITH COLOR FRAMING PHASE SYNCHRONIZATION

BACKGROUND OF THE INVENTION

The present invention relates to an apparatus for recording and reproducing signals on a magnetic tape which is capable of reproducing signals at variable speeds.

A helical-scan video tape recorder (hereinafter simply referred to as a helical VTR or more simply VTR) is provided with a rotary magnetic head which scans tracks formed on a magnetic tape oblique to its direction of feed for recording and reproducing video and audio signals on the magnetic tape. In such helical VTR's, head tracking techniques allow the rotary magnetic head to follow the tracks on the tape so that high-quality reproduction can be achieved even if the tape is running at a speed different from that used during recording. In practice, in a broadcasting station, a helical VTR is set to single-frame reproduction mode at the starting point of news material or commercial (CM) material previously confirmed by single-frame reproduction, and the VTR is then switched to constant-speed reproduction mode at a desired time to send the news or CM material to a video screen device, etc. In this case, it is necessary to synchronize the color frame of the reproduced color video signal of the VTR with the color frame of a reference color video signal of, e.g., a parent VTR within a broadcasting station as quickly as possible to maintain the continuity and synchronization of the color subcarrier wave when the video signals are exchanged. This is because in NTSC (National Television System Committee) color television, interleaving has been adopted and so the frequency of the color subcarrier wave is an odd multiple of ½ of the horizontal scanning frequency $f_H$ so that both color subcarrier waves come into phase with each other at intervals of four fields.

VTR systems such as is shown in FIG. 1 have been used to carry out the color framing described above. In FIG. 1, numeral 1 denotes a rotary magnetic head, the output signal of which, i.e., the reproduced RF (radio frequency) signal is sent to an FM demodulator 3 via a reproduction amplifier 2. The color video signal outputted by the demodulator 3 is sent to a video output terminal 4. Numeral 5 denotes a capstan which controls the travel of the tape T and which is directly linked with a motor 6. Numeral 7A denotes a drive amplifier and 7C denotes a servo circuit. A reproduction control signal CTL from a control signal head (not shown) is sent to the servo circuit 7C via a terminal 8. A reference video siganal REF is sent to a pulse generator 9 via a signal terminal 10. The rotation of the capstan motor 6 is controlled by the output of the drive amplifier 7A which is the amplified output of the servo circuit 7C (phase error signal $S_E$) derived from a reference phase signal $S_R$ from the pulse generator 9 and the control signal CTL received via the terminal 8.

Numerals 11 and 12 denote color framing detectors for the reproduced color video signals and reference color video signals REF respectively. The detection outputs of both detectors 11 and 12 are sent to a comparator 13 and the output signal of the comparator 13 is sent to the servo circuit 7C.

When the VTR shown in FIG. 1 changes from single-frame reproduction mode to constant-speed reproduction mode and the tape T begins to run, the servo circuit 7C receives the reproduction control signal CTL of the secondary tape from the terminal 8 and the reference phase signal $S_R$, derived from the reference (parent) video signal REF shown in FIG. 2A, which goes "High" every other field as shown in FIG. 2B. The capstan motor 6 is controlled by the servo circuit 7C so that the reproduced control signal CTL is synchronized in phase with the reference phase signal $S_R$. The secondary tape T enters the constant-speed running state in which the reproduced video signal is synchronized in phase with the reference video signal after the expiration of a draw-in time needed by the capstan servo system, which includes the motor 6, drive amplifier 7A, and servo circuit 7C (the draw-in time refers to the period of, e.g., one to several seconds required for the above-described phase synchronization).

As described above, the capstan servo system, i.e., the tape T is synchronized in phase (locked) with the reference video signal REF so as to make the color framing of the reproduced video signal and of the reference video signal REF coincide. Each group of four tracks TKa, TKb, TKc and TKd on the helical VTR tape correspond to first through fourth field intervals of a single color frame interval, as shown in FIG. 3. Control signal pulses CPa and CPc are recorded on the control signal track CTK at the start of the tracks TKa and TKc, that is, at the start of every other track.

In this way, since the control signal pulses (CPa etc.) are not recorded at the rate of one per four tracks of each color frame but rather at a rate of one track per two tracks of every frame, the tape T is synchronized in phase with the reference video signal REF. In the first field interval following activation of the secondary tape T, the track TKa corresponding to the first field of the color frame of the reproduced video signal and the track TKc corresponding to the third field will both be tracked by the reproduction rotary magnetic head 1 at probabilities of 50 percent. It should be noted that, in the case when the latter track TKc is the first to be tracked, the color framing of the reproduced video signal will fail to match that of the reference video signal REF.

In the case described above, the previously proposed VTR temporarily stops the servo circuit (7C) when the comparator 13 determines that the color framings do not coincide and thus the phase synchronization of the capstan servo system and the reference video signal REF is released. Under the above-described conditions, while the tape T is running in the direction denoted by the arrow $V_{TP}$ in FIG. 3, at the control signal pulse CPc of the third field, the phase of the capstan 5 is offset by two fields (=1 frame) from the control signal pulse of either CPa of the first field of the same subsequent color frame or from CPe of the first field of the next color frame.

As described above, in the previously proposed helical VTR, after the capstan servo system has once been synchronized with the reference video signal upon activation, it may be necessary for the capstan servo system to again be brought into phase with the reference video signal REF by offsetting the phase of the capstan by one frame in order to make the color framing of reproduced video signal coincide with that of the reference video signal REF.

Therefore, a redrawing-in time may also be needed in addition to the drawing time of the capstan servo system after the VTR is activated. In addition, since the phase of the capstan servo system will be incorrect during the redrawing-in time, there will be significant audio distortion in the reproduced signals.

SUMMARY OF THE INVENTION

With the above-described problem in mind, it is an object of the present invention to provide an apparatus for recording and reproducing signals such as video signals on a magnetic tape which can quickly synchronize the color framing of a reproduced video signal with that of a reference video signal upon activation.

The above-described object can be achieved by providing an apparatus for recording and reproducing signals on a magnetic tape, comprising: (a) a rotary magnetic head for scanning the magnetic tape on which tracks, each storing one field of at least video information, are arranged obliquely at equal intervals along the tape to reproduce video signals; (b) a servo circuit for controlling a capstan motor on the basis of a control signal produced for every two fields on the magnetic tape and a reference video signal supplied externally; (c) first means for storing color framing information for the reproduced video signals at a time when the tape is stopped; (d) second means for detecting the number of frames by which the reproduced video signals are to be delayed in order to bring the color framing thereof into phase with the color framing of the reference video signal; (e) third means for comparing color framing information for the reproduced video signals stored in the first means and the reference video signals in response to an activation command signal; and (f) fourth means for activating the capstan motor via the servo circuit in response to the activation command signal and for deactivating the capstan motor via the servo circuit on the basis of the output of the second means, the fourth means being controlled on the basis of the results of the comparison by the third means.

BRIEF DESCRIPTION OF THE DRAWINGS

A more complete understanding of the present invention may be obtained from the following detailed description taken in conjunction with the attached drawings in which:

FIG. 4 is a circuit block diagram of a magnetic recording and reproducing apparatus tape in a first preferred embodiment according to the present invention;

FIGS. 5A-5F are a signal timing chart for explaining the operation of the first preferred embodiment shown in FIG. 4;

FIG. 6 is a circuit block diagram of the magnetic tape recording and reproducing apparatus in a second preferred embodiment according to the present invention; and FIGS. 7A-7F are a signal timing chart for explaining the operation of the second preferred embodiment shown in FIG. 6 according to the present invention.

DETAILED DESCRIPTION OF THE PREFERRED EMBODIMENTS

Reference will hereinafter be made to the drawings in order to facilitate understanding of the present invention.

Figure 1:
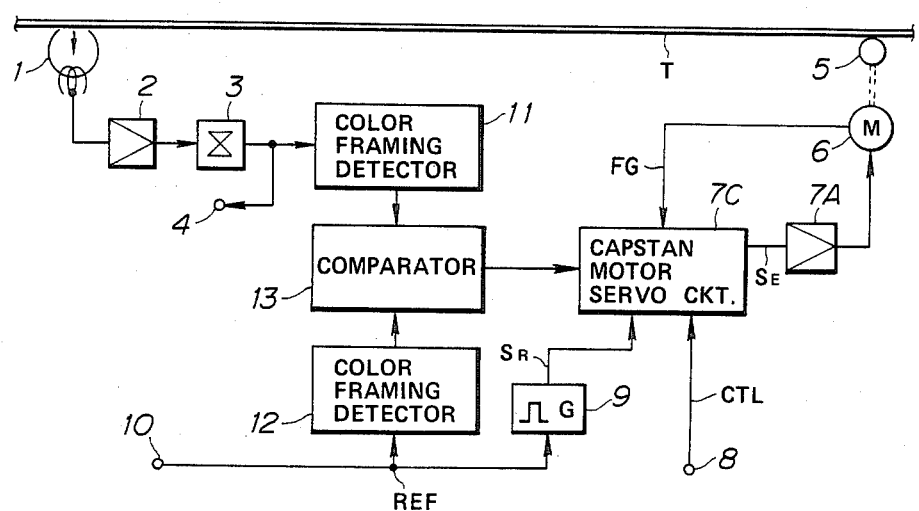
FIG. 1 is a circuit block diagram of a conventional video tape recorder.
Figure 2A:
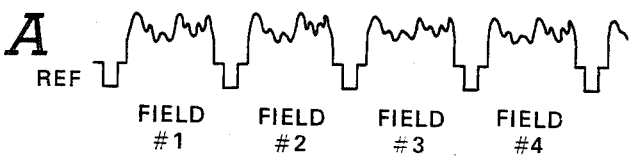
FIGS. 2A & 2B are of a timing chart comparing a reference video signal and a servo reference signal for explaining the operation of the conventional video tape recorder.
Figure 2B:

FIG. 4 shows a first preferred embodiment of the magnetic tape recording and reproducing apparatus. In FIG. 4, the same reference numerals as those shown in FIG. 1 designate corresponding elements.

As shown in FIG. 4, a memory 20 is provided in which the output signal of the color framing detector 11 for the reproduced video signal is stored. A comparator 21 receives the output signals of the color framing detector 11 read from the memory 20 and of the color framing detector 12 for the reference video signal REF and a constant-speed reproduction (activation) command signal CMDp. A phase-adjustment-amount detection circuit 22 receives the output signals of the capstan servo circuit 7C and of the comparator 21. A first switch 23 receives the constant speed reproduction command signal CMDp from a command terminal 26 as a switching drive signal. One fixed contact 23a is connected to a plus terminal of a power supply 24 and the other fixed contact 23b is grounded. A movable contact 23c of the switch 23 is connected to one fixed contact 25b of a second switch 25. The other fixed contact 25a receives the output signal from the servo circuit 7C. The movable contact 25c is connected to a drive amplifier 7A. The second switch 25 receives the output signal of the phase-adjustment-amount detector 22 as the switching drive signal.

The phase adjustment amount detection circuit 22 and an activation control circuit including both switches 23, 25 and the power supply 24 constitute a phase adjustment control circuit 200.

In constant-speed reproduction mode, the movable contact 25c of the second switch 25 is connected to the fixed contact 25a and a phase error signal $S_E$ is sent to the drive amplifier 7A from the servo circuit 7C. The color framing detection circuit 11 periodically detects the color framing of the reproduced video signal on the basis of a color frame ID (Identification) signal (hereinafter, referred to as a reproduction ID signal) included in a time code signal reproduced from the tape T when in phase with the reference video signal REF.

The above-described reference video signal REF includes a reference color frame ID signal (hereinafter, referred to as reference ID signal) and a reference frame pulse, the timing of which are shown in A and B of FIG. 5 respectively. Since the reproduced video signal is locked in phase with the reference video signal, the timings of the reproduced ID signal and the reproduced control signal CTL coincide with the reference ID signal and reference frame pulse, as shown in the leftmost parts of C and D of FIG. 5, respectively.

Figure 3:
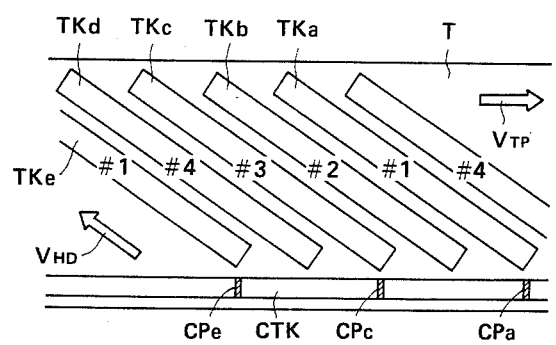
FIG. 3 is a diagram of a tape format used in conventional video tape recorders.

When the VTR is changed to the single-frame reproduction mode, the movable contact 23c of the first switch 23 is connected to the other fixed contact 23b which is grounded. Since the second switch 25 is also switched to a state in which the movable contact 25c is connected to the fixed contact 25b, the output terminal of the drive amplifier 7A is grounded. Therefore, the capstan motor 6 and tape T are stopped. At this time, the tape T is controlled so that the control signal pulses CPa, CPc, ... (refer to FIG. 3) recorded on the control signal track CTK of the tape T maintain constant positional relationships with the magnetic head 1. The color framing of the reproduced video signal at the time $t_1$ is stored in the memory 20.

As shown in C and D of FIG. 5, if the tape T is stopped at the time $t_1$ immediately before reproduction of the ID signal and the control signal CTL, the reproduced ID signal and reproduced control signal CTL cannot be obtained until after the tape starts to run again. Color framing of the reproduced video signal at the time of $t_1$ is written into the memory 20.

When the VTR is changed from the single-frame reproduction mode to the constant-speed reproduction mode, the movable contact 23c is connected to the one fixed contact 23a as shown in FIG. 4 in response to the activation command signal CMDp. On the other hand, since the movable contact 25c of the second switch 25 is connected to the fixed contact 25b, the voltage of the power supply 24 is sent to the drive amplifier 7A. The capstan motor 6 activated in this way rotates at a high speed so that the speed of tape T increases rapidly.

The phases of the reproduced ID signal and the reproduced control signal appearing after the time $t_3$ match their phases at the time $t_1$ when the tape was stopped as shown in C and D of FIG. 5.

The comparator 21 receives the activation command signal CMDp at the time $t_3$. At this time, the comparator 21 compares the color framing of the reference video signal REF detected by the detector 12 with the color framing of the reproduced video signal obtaining when the tape was stopped at the time $t_1$ read from the memory 20. Since in the above-described case, a reproduced ID signal will appear within the interval W 1/30 seconds after the activation command signal CMDp is issued, the comparator 21 determines that the color framings of both reference and reproduction video signals are in agreement and sends a phase adjustment command signal $CMD_E$ of the form 2n frames, where n denotes zero or an integer, to the phase adjustment amount detector 22.

The phase adjustment detector 22 detects the necessary number of phase adjustment frames on the basis of the number of times the phase error signal $S_E$ (the output signal of the servo circuit 7C) changes polarity. A detailed description of the detection of the number of phase adjustment frames by means of the phase adjustment amount detector 22 is given in Japanese Patent Application Ser. No. Sho. 59-20222 by the same Applicant.

The capstan motor servo circuit 7C includes an integrator which receives the reference phase signal $S_R$ as a reset signal and outputs an integrated signal in the form of a reference sawtooth wave signal. The above-described reference sawtooth wave signal has the same frequency (30 hertz) as the reference phase signal $S_R$ and its amplitude increases linearly from zero to a peak at a predetermined rate. Hence the instantaneous value of the reference sawtooth wave signal represents the phase of the reference phase signal $S_R$ within one period. The capstan motor servo circuit 7C also includes a counter receiving the reproduced control pulse signal CTL as a reset signal and counting frequency pulses FG representing the number of turns of the capstan motor 6 per unit time and a converter for converting the contents of the counter into an analog value, which is used as a comparison sawtooth wave signal representing the phase of the tape T. Since the reproduced control pulse signal CTL has the same frequency as the frame frequency (30 hertz), the frequency pulse signal FG has a frequency several tens of times that of the frame frequency pulses. The comparison sawtooth wave signal produced by counting the frequency pulse signal FG has the same period as the reproduced control pulse signal CTL and is obtained as a continuously changing signal during the period of the control pulse signal CTL. The pulse interval of the frequency pulse signal corresponds to the rotational speed of the capstan, hence, to the running speed of the tape T. Therefore, the slope of the comparison sawtooth wave output signal represents the rotation speed of the capstan. Since the comparison sawtooth wave signal amplitude is zero when the reproduced control pulse signal CTL is issued and reaches a peak just before the next reproduced control pulse signal CTL the instantaneous value of the comparison sawtooth wave output signal represents the phase of the capstan (hence, the phase within one control-pulse interval).

The capstan motor servo circuit 7C derives the phase error signal $S_E$ from the difference between the comparison sawtooth wave output signal and the reference sawtooth wave output signal. It is noted that the phase error signal $S_E$ reverses polarity when the phase of the comparison sawtooth wave signal differs from that of the reference sawtooth wave output signal by more than 180°. This means that when the phase of the comparision sawtooth wave output signal is within 180° of the reference sawtooth wave output signal, the phase error signal $S_E$ is sent to the drive amplifier 7A as it is to control the speed of the capstan so as to eliminate the phase difference, and thus the comparision sawtooth wave output signal is locked in phase with the reference sawtooth wave output signal. However, if the phase of the comparision sawtooth wave output signal differs by 180° or more from that of the reference sawtooth wave output signal, the comparision sawtooth wave output signal cannot be locked in phase with the reference sawtooth wave output signal in the present period. Rather, the servo must phase-lock these signals in the next period. Thus, each polarity inversion of the phase error signal $S_E$ means that the phase of the comparision sawtooth wave output signal is advanced or delayed by one period. Since the period of the reference phase signal $S_R$ and the reproduced control pulse signal CTL corresponds to one frame of the video signal recorded on a tape. The number of polarity inversions of the phase error signal $S_E$ occur are counted by the phase adjustment amount detector 22, the counted value of which represents the number of times the phase of the comparison sawtooth wave output signal overtakes and passes the phase of the reference sawtooth wave output signal.

In this way, the phase error signal $S_E$ represents the number of frames by which the phase adjustment has been made by means of the capstan drive system including the capstan motor 6 and drive amplifier 7A.

When the number of polarity inversions of the phase error signal $S_E$ reaches 2n, the detected output signal of the phase adjustment amount detector 22 switches the connection of the movable contact 25c of the second switch 25 from the other fixed contact 25b to the one fixed contact 25c, as shown in FIG. 4, so that the motor 6 is turned off and the loop of the capstan servo system is closed and the servo system is locked in phase with the reference video signal REF. Consequently, the VTR enters the constant speed reproduction state.

As shown in E and F of FIG. 5, when the tape stops at the time $t_2$ immediately before a field boundary at which a reproduction control signal is generated in the absence of a reproduced ID signal, the color framing of the reproduced video signal at the time of $t_2$ is written into the memory 20.

In this case, since the reproduced ID signal is not present within an interval W of the reference ID signal immediately after the activation command signal CMDp is issued, the comparator 21 determines that the color framings of the two video signals do not coincide and sends the phase adjustment command signal CMDo representing a phase adjustment of $(2n+1)$ frame to the phase adjustment amount detection circuit 22.

After the detection circuit 22 detects a number of times the polarity inversions $(2n+1)$ in the phase error signal $S_E$ outputted by the servo circuit 7C, the capstan servo loop is closed in the same way as described above.

In the embodiment shown in FIG. 4, the numbers of required phase adjusting frames are selected on the basis of the respective color framings of the reproduced video signal and reference video signal at the time when the activation command signal is issued and the phase adjustment by the required number of frames is carried out immediately after activation. Therefore, the color framings of the reproduced video and reference video signals can quickly be matched with each other and the time interval during which wow and flutter degrade the audio signal can be shortened remarkably.

The second preferred embodiment of the present invention will be described with reference to FIGS. 6 and 7.

In FIG. 6, the phase adjustment amount detection circuit denoted by 22F receives only the output signal from the servo circuit 7C, as opposed to the corresponding circuit 22 of the first preferred embodiment. The output signal from the phase adjustment detection circuit 22F is sent to the second switch 25 as a switch control signal. One fixed contact 27a of a third switch 27 receives the activation command signal CMDp from the command terminal 26 via a delay circuit 28 which induces a delay of one frame interval. The other fixed contact 27b of the third switch 27 receives the command signal CMDp directly.

The output signal passing through the movable contact 27c of the third switch 27 is sent to the first switch 23 as the switch control signal and the output signal from the comparator 21 is sent to the third switch 27 as the control signal. The construction of the rest of the system is the same as in the first preferred embodiment shown in FIG. 4.

The operation of the second preferred embodiment shown in FIG. 6 will be described with reference to FIG. 7.

In the case when the tape stops at the time of $t_1$ immediately before an instance where the reproduced ID signal and the reproduced control signal are produced simultaneously as shown in C and D of FIG. 7 (the same as shown in C and D of FIG. 5), the color framing of the reproduced video signal at the time of $t_1$ is written into the memory 20. At the time $t_3$ at which the activation command signal CMDp is issued, the color framing of the reference video signal REF at that time $t_3$ and the color framing of the reproduced video signal at the time $t_1$ which is read from the memory 20 are compared by the comparator 21.

In the same way as described above, the color framings of the reproduced and reference video signals coincide and the phase adjustment command signal $CMD_E$ representing a phase adjustment amount of 2n frames is sent to the third switch 27 so that the fixed contact 27b of the third switch 27 is, in turn, connected to the movable contact 27c. At this time, the activation command signal CMDp passing through this switch 27 is sent to the first switch 23 so that the fixed contact 23a is immediately connected to the movable contact 23c as shown in FIG. 6. At this time, because the fixed contact 25b of the second switch 25 is connected to the movable contact 25c, the voltage of the power supply 24 is sent to the drive amplifier 7A. The capstan motor 6 in the activation state turns at a high speed to raise the speed of the tape T quickly. In the second preferred embodiment, the phase adjustment amount detection circuit 22F is set to count 2n frames.

When the number of phase adjustment frames beginning at the time $t_3$ reaches 2n, the detected output signal of the phase adjustment amount detection circuit 22F causes the second switch 25 to switch to the connection state shown in FIG. 6 so that the capstan motor 6 is turned off and the capstan servo loop system is closed.

As shown in E and F of FIG. 7, in cases where the tape T stops at the time $t_2$ immediately before an instance where only the reproduced control signal is produced, the color framing of the reproduced video signal at the time of $t_2$ is written into the memory 20. At the time $t_3$ at which the activation command signal CMDp is produced, the comparator 21 compares the color framing of the reference video signal REF at the time of $t_3$ with the color framing of the reproduced video signal at the time $t_2$ at which it is read from the memory 20. Since in this case the color framings of the reproduced and reference video signals do not coincide, a phase adjustment command signal CMDo indicative of $(2n+1)$ frames is sent to the third switch 27 from the comparator 21 so that the fixed contact 27a of the third switch 27 is connected to the movable contact 27c. Then, the activation command signal CMDp from the command terminal 26 is converted to a delay activation command signal $CMD_D$ by delaying it by a period corresponding to one frame interval. Therefore, as shown in E and F of FIG. 7, the fixed contact 23a of the first switch 23 is connected to the movable contact thereof 23c as shown in FIG. 6 at a time $t_4$. At this time, since the second switch 25 is switched so that the fixed contact 25b is connected to the movable contact 25c, as opposed to the connection state shown in FIG. 6, the speed of tape T can quickly be increased.

In this case, if the tape were started at the time $t_3$ in response to the activation command signal CMDp, the color framings of the reproduced video signal and the reference video signal would not coincide. However, since the tape is started at the time $t_4$ delayed by one frame interval from the time $t_3$, the color framings of the reproduced and reference video signals will coincide.

Thereafter, in the same way as described above, the capstan motor servo loop system is closed at the time when the phase adjustment amount detection circuit 22F detects completion of a phase adjustment of 2n frames and the VTR enters the constant speed state.

In the second preferred embodiment shown in FIG. 6, the tape is activated immediately after or after a delay of one frame interval, depending on whether or not the respective color framings of the reproduced video signal and the reference video signal coincide at the time of issuance of the activation command signal. Therefore, in the same way as in the first embodiment shown in FIG. 4, quick alignment of the reproduced and reference video signals can be achieved upon activation and the time interval during which wow and flutter may appear can be shortened remarkably.

As described hereinabove, the present invention is applicable to a NTSC (National Television System Committee) helical-scan VTR. When the present invention is to be applied to a PAL (Phase Alternation Line) helical-scan VTR, the two-contact switch construction of the third switch 27 shown in FIG. 6 needs to be replaced wiht a four-contact switch construction and another delay circuit 28 having delay times corresponding to two fields, four fields, and six fields needs to be provided according to the four kinds of control output from the comparator 21 since each color frame in the PAL system is made up of eight fields and the control signal is recorded with every two fields. As described with reference to the first and second preferred embodiments, the apparatus according to the present invention assigns the number of phase adjustment frames upon activation and, if necessary, assigns the delay time after activation according to the results of comparison of the color framings of the reproduced video signal and the reference video signal when the activation command signal is issued. Therefore, the helical VTR can quickly bring the color framings of the reproduced video signal and the reference video signal into agreement upon activation.

It will fully be understood by those skilled in the art that the foregoing description has been made in terms of the preferred embodiments and various changes and modifications can be made without departing from the scope of the present invention which is to be defined by the appended claims.

What is claimed is:

1. An apparatus for recording and reproducing signals on a magnetic tape, comprising:
    (a) a rotary magnetic head for scanning the magnetic tape on which tracks, each storing one field of at least video information, are arranged obliquely at equal intervals along the tape to reproduce video signals;
    (b) a servo circuit for controlling a capstan motor on the basis of a control signal produced for every two fields on the magnetic tape and a reference video signal supplied externally;
    (c) first means for storing color framing information for the reproduced video signals at a time when the tape is stopped;
    (d) second means for detecting the number of frames by which the reproduced video signals are to be delayed in order to bring the color framing thereof into phase with the color framing of the reference video signal;
    (e) third means for comparing color framing information for the reproduced video signals stored in said first means and the reference video signals in response to an activation command signal; and
    (f) fourth means for activating the capstan motor via the servo circuit in response to the activation command signal and for deactivating the capstan motor via the servo circuit on the basis of the output of the second means, the fourth means being controlled on the basis of the results of the comparison by the third means.

2. The apparatus according to claim 1, wherein when the third means compares both color framing informations for the reproduced and reference video signals and determines that both of them coincide with each other, the third means outputs a phase adjustment command signal indicating the number of phase adjustment of 2n frame (n denotes zero or integer) to the second means.

3. The apparatus according to claim 1, wherein when the third means compares both color framing informations for the reproduced and reference video signals and determines that both of them do not coincide with each other, the third means outputs a phase adjustment command signal indicating the number of phase adjustment of (2n+1) frames (n denotes zero or integer) to the second means.

4. The apparatus according to claim 2, wherein the second means detects the number of frames by which the reproduced video signals are to be delayed in response to the phase adjustment command signal from the third means, the number of frames being detected from the number of times the polarity of a phase error signal ($S_E$) formed on the basis of a reproduced control signal (CTL) from the tape which has started to run and reference phase signal ($S_R$) formed of the reference video signal (REF) at the servo circuit, and when the number of times reach 2n indicated by the phase adjustment command signal, the second means outputs the detected signal to the fourth means so as to deactivate the capstan motor.

* * * * *